3,105,761
PHOTO-PRINTING PROCESS INCLUDING A LIGHT FILTER

Peter L. Foris, Dayton, Ohio, assignor to The National Cash Register Company, Dayton, Ohio, a corporation of Maryland
No Drawing. Filed Sept. 19, 1958, Ser. No. 761,930
5 Claims. (Cl. 96—27)

This invention relates to a light filter to be used in conjunction with a continuous-tone black-and-white transparency of an image to be photographically printed, and to the method of making and using such a filter.

The novel light filter is of sheet form, preferably consisting of a sheet of film-forming material having dissolved therein a chemical compound, or compounds, of the photochromic type, which change from a normally colorless state to a colored state upon being subjected to ultra-violet electro-magnetic radiation of wave lengths between 3,200 and 4,000 A. This film may be self-supporting or fixed to a supporting sheet of material. The filter, whether self-supporting or supported on another sheet, is substantially light-transparent, subject to change by being subjected to the ultra-violet radiation described.

To condition the filter for use in making photographic prints, it must be exposed to the ultra-violet radiation through a transparency of the image to be reproduced. The then-conditioned filter is used in conjunction with the transparency to make the print.

In a standard example of the use of the filter after it is prepared or conditioned, a receiving sheet for the photographic image, coated with an emulsion containing a silver halide compound of standard type, is placed beneath a light source having a visible radiation equivalent to a color temperature of between 2,800 and 7,000 degrees Kelvin. This light source is used to project a diffuse beam of light through the transparency of the image to be produced, said transparency being of a negative or positive character, and then through the prepared or conditioned novel filter to control the image, which is thus projected onto an underlying photo-sensitized print-receiving surface of a receiving sheet.

The novel filter contains one or more of the photochromic compounds constituting the group consisting of 10-(9'-xanthylidene)-anthrone; 3 chloro-10-(9'-xanthylidene)-anthrone; 3 methyl-10-(9'-xanthylidene)-anthrone; 4' chloro-10-(9'-xanthylidene)-anthrone; 9,9'-dixanthylene; and 10,10'-dianthrone, said photochromic compounds being relatively stable in a substantially colorless form when in the dry and undissolved condition, but being responsive to ultra-violet electro-magnetic radiation when in a dissolved state, whether in liquid solution or in solid solution, such ultra-violet radiation causing such photochromic compounds to become absorbent to electro-magnetic radiation between 4,000 and 5,500 A. These compounds, as is known, have a common behavior at room-temperature in that once they are converted to the colored form by ultra-violet light they are irreversible by application of longer wave lengths of light, thus permitting them to be used in photo-printing operations involving 2,800°–7,000° Kelvin light, onto silver-halide coated paper, without the masking image being destroyed in the process. Due to the fact that it is easier to handle the filter when it is composed of a dry solid solution of such compound material, the preferred form of the filter is to have the used compound or compounds dissolved in a substantially light-transparent solid dry film-forming material which is itself self-supporting when in sheet form. The film, however, may be, as said, coated on a substantially light-transparent web such as glass or equivalent material for additional support.

The radiation from the ultra-violet light source, passing through the clear portions of the controlling image transparency, has more effect upon the underlying filter than the reduced light coming through the darker portions of the image transparency, and, thus, will create, in the filter itself, an image, of differentially light-absorbing portions, corresponding to the image transparency, said filter image, by its characteristic differential light absorption, transmitting the image to be printed so as to bring out the details represented by the clearer portion of the transparency, without destroying the printed detail of the darker portions of the transparency. The filter thus is prepared for use with a particular image transparency by ultra-violet light alone, with no liquids involved.

These characteristics of the filter depend upon the light-absorption charcteristics of the photochromic compound or compounds used in the filter, such absorption characteristics differentially controlling the amount of light of the various wave lengths passing through it.

In general, the filter is extremely useful in bringing out shadow detail in a transparency negative having great contrast range as concerns different areas thereof.

It will be understood that the characteristics of the filter will vary according to the amount of the photochromic compound used in a unit area of the filter and that the amount of photochromic compound used should vary with the characteristics of the negative.

Where a negative transparency has wide density variations and it is desired to bring out the details in every area without regard to tonal variations in the print, the filter of this invention is better used at a slight distance from the negative, measured in small fractions of, say, a quarter of an inch; otherwise the filter should be used directly in contact with the negative transparency.

Assuming that the supporting medium of the filter material is substantially transparent, only between 0.1 and 0.5 gram of photochromic compound per square foot need be used.

The filter compensates for overexposed and underexposed areas of the transparency, so that details therein which ordinarily could not be printed are easily reproduced on the print-receiving surface.

The filter, made by coating a film-forming solution of the photochromic compound or compounds onto a plate, and dried to a solid, is sensitive to daylight or artificially produced light and should be kept in the dark or in very subdued light until ready for use. When the filter has been used in conjunction with the transparency for producing a print, it retains thereon the image produced through the transparency by the ultra-violet light source and, thus, is useful for producing other prints in conjunction with the same transparency.

The filter may be sensitized with the image through a transparency of the image substantially in contact therewith by exposure to strong light, such as sunlight or the ultra-violet light specified herein, and then used in a photographic printing machine, either of the direct contact type or of the projected image type. The sensitization of the filter must be accomplished by use of the ultra-violet radiation specified, and the filter so produced may be used in conjunction with light from which the ultra-violet component has been largely eliminated, to produce prints of the improved quality.

The named photochromic compounds, or equivalents, individually or in mixtures, may be dissolved in a solution or liquid mixture of a normally solid film-forming material or in a liquid plasticizer for the film-forming material. Upon the solidification of a film, coated or cast, made from such, the photochromic compound or compounds, which are solids at temperatures less than approximately 250 degrees centigrade, remain in solid solution with the solidified film-forming material. As before specified, the film may be coated, as a liquid film, on glass or equivalent clear material, and solidified to form the filter, or a film formed on a smooth surface may be stripped therefrom, when solidified, to form a self-supporting filter.

As specific examples of such film-forming material may be mentioned, in parts by weight:

*Example*

(I) Cellulose-acetate-butyrate having approximately, in combined form, by weight, 50% combined cellulose residue, 37% combined butyryl, 13% combined acetyl, and 2% free hydroxyl in cellulose residue (sold under the trade designation "Half-Second Butyrate #EAB-381") _____ 25.0
Chlorinated diphenyl having 60%, by weight, chlorine content_____ 25.0
Toluene _____ 28.0
Methyl-ethyl ketone_____ 22.0
Ethanol 95%_____ 5.4
Butanol _____ 0.6
Photochromic compound_____ 0.375

(II) Cellulose-acetate-butyrate having approximately, in combined form, by weight, 50% combined cellulose residue, 37% combined butyryl, 13% combined acetyl, and 2% free hydroxyl in cellulose residue (sold under the trade designation "Half-Second Butyrate #EAB-381")_____ 25.0
Dioctyl-phthalate _____ 25.0
Toluene _____ 32.0
Acetone _____ 10.0
Ethanol 95%_____ 8.0
Photochromic compound_____ 0.2

The foregoing examples form self-supporting films in thicknesses greater than about 0.002 of an inch. Such films also may be used on either side or on both sides of clear stiff synthetic resin sheets or on glass sheets, if stiffness is desired in the filter.

Starting with an unexposed filter, it may be secured to and in contact with a negative transparency sandwichwise, the two, together, first being exposed to the ultra-violet light and then used as a control in printing the image photographically. Such combination of filter and transparency, as well as the filter sheet, and their method of use form a part of this invention.

What is claimed is:

1. A light-absorbing and light-transmititng filter sheet for use in making photographic prints on a surface coated with a silver halide emulsion sensitive to electro-magnetic radiation coming from a light source having a color temperature of between 2,800 and 7,000 degrees Kelvin, said sheet comprising a substantially colorless and light-transparent soluble solid organic polymeric film material having dissolved therein at least one of the compounds taken from the group consisting of 10-(9'-xanthylidene)-anthrone; 3 chloro-10-(9'-xanthylidene)-anthrone; 3-methyl-10-(9'-xanthylidene)-anthrone; 4' chloro-10-(9'-xanthylidene)-anthrone; 9,9'-dixanthylene; and 10,10'-dianthrone, such compounds irreversibly changing in state when irradiated with ultra-violet light while in solution, so as to absorb electro-magnetic radiation of between 4,000 and 5,500 A.

2. A light filter for use in conjunction with a film transparency of an image to be reproduced photographically, comprising a self-supporting substantially colorless sheet of a soluble organic polymeric film-forming substance having dissolved therein at least one of the compounds taken from the group consisting of 10-(9'-xanthylidene)-anthrone; 3 chloro-10-(9'-xanthylidene)-anthrone; 3 methyl-10-(9'-xanthylidene)-anthrone; 4' chloro-10-(9'-xanthylidene)-anthrone; 9,9'-dixanthylene; and 10,10'-dianthrone, such compounds irreversibly changing in state when irradiated with ultra-violet light while in solution, so as to absorb electro-magnetic radiation of between 4,000 and 5,500 A.

3. The process of making a photographic print onto a sheet sensitized with a coating of silver halide emulsion sensitive to electro-magnetic radiation having a wave length range of between 300 and 580 millimicrons, consisting of the projection of light having a color temperature of between 2,800 and 7,000 degrees Kelvin onto said surface through a transparency of an image to be reproduced and then through a light filter substantially in contact therewith, said filter consisting of a substantially colorless and light-transparent solid solution of a soluble organic polymeric film-forming material and at least one of the compounds taken from the group consisting of 10-(9'-xanthylidene)- anthrone; 3 chloro-10-(9'-xanthylidene)-anthrone; 3 methyl-10-(9'-xanthylidene)-anthrone; 4' chloro-10-(9'-xanthylidene)-anthrone; 9,9'-dixanthylene; and 10,10'-dianthrone, such compounds irreversible changing in state when irradiated with ultra-violet light while in solution, so as to absorb electro-magnetic radiation of between 400 and 550 millimicrons, and said filter having previously been subjected to ultra-violet electro-magnetic radiation passed through said image transparency.

4. A dry process for making a control filter for photographic printing from an image sheet transparency including the steps of providing a dry sheet of film-forming solid organic polymeric material having dissolved therein at least one of the compounds taken from the group consisting of 10-(9'-xanthylidene)-anthrone; 3 chloro-10-(9'-xanthylidene)-anthrone; 3 methyl-10-(9'-xanthylidene)-anthrone; 4' chloro-10-(9'-xanthylidene)-anthrone; 9,9'-dixanthylene; and 10,10'-dianthrone, such compounds irreversibly changing in state when irradiated with ultra-violet light while in solution, so as to absorb electro-magnetic radiation of between 4,000 and 5,500 A. and subjecting it to ultra-violet electro-magnetic radiation through a transparent sheet having thereon the image to be reproduced.

5. The process of making a photographic print having good detail from the dark areas of a transparency having a wide range of contrast onto a surface sensitive to electro-magnetic radiation having a wave length range between 300 and 580 millimicrons, consisting of the steps of making a sandwich of a light-controlling transparency film to be photographically printed and a solid light-filter film of organic polymeric material containing a substantially light-transparent material taken from the class consisting of 10-(9'-xanthylidene)-anthrone; 3 chloro-10-(9'-xanthylidene) - anthrone; 3-methyl-10-(9'-xanthylidene)-anthrone; 4'-chloro-10-(9'-xanthylidene)-anthrone; 9,9'-dixanthylene; and 10,10'-dianthrone, which light-filter film becomes less transparent in the range of 4000 to 5500 A. in response to ultra-violet light applied thereto; projecting ultra-violet radiation through the transparency film onto the filter, which together make up the sandwich, to differentially vary the light-passing ability of the filter according to the ultra-violet light passing through the transparency to thereby condition the filter; and then projecting light equivalent to a color temperature of between 2,800 and 7,000 degrees Kelvin through the sandwich made up of the transparency and the ultra-violet-light-conditioned filter onto said surface to make the photographic print.

References Cited in the file of this patent

UNITED STATES PATENTS

| | | |
|---|---|---|
| 1,878,684 | Eberlin | Sept. 20, 1932 |
| 1,994,596 | Staud et al. | Mar. 19, 1935 |
| 2,082,178 | Ochwat | June 1, 1937 |
| 2,203,652 | Ehrenfried | June 4, 1940 |
| 2,420,636 | Yule | May 13, 1947 |
| 2,461,485 | Thompson | Feb. 8, 1949 |
| 2,676,887 | Chalkley | Apr. 27, 1954 |
| 2,735,783 | Tamblyn et al. | Feb. 21, 1956 |
| 2,877,167 | Chalkley | Mar. 10, 1959 |
| 2,877,169 | Chalkley | Mar. 10, 1959 |

FOREIGN PATENTS

| | | |
|---|---|---|
| 343,212 | Great Britain | Feb. 19, 1931 |
| 467,609 | Great Britain | June 21, 1937 |

OTHER REFERENCES

Hirshberg: "Chemical Abstracts," pp. 10059–60, vol. 45 (1951).

Hirshberg: "Chemical Abstracts," pp. 2160, vol. 47 (1953).

Hirshberg et al.: "Chemical Abstracts," p. 1871, vol. 46 (1952).

Hirshberg et al.: "Chemical Abstracts," p. 658, vol. 48 (1954).

Hirshberg et al.: J. Chem. Soc. (1953), pp. 629–36.

Neblette: "Photography—Its Materials and Processes," 5th edition, 1952, pp. 480–1.

UNITED STATES PATENT OFFICE

CERTIFICATE OF CORRECTION

Patent No. 3,105,761                        October 1, 1963

Peter L. Foris

It is hereby certified that error appears in the above numbered patent requiring correction and that the said Letters Patent should read as corrected below.

Column 4, line 46, for "9,0'" read -- 9,9' --.

Signed and sealed this 21st day of April 1964.

(SEAL)
Attest:
ERNEST W. SWIDER

EDWARD J. BRENNER

Attesting Officer

Commissioner of Patents